(12) United States Patent
Traverso et al.

(10) Patent No.: US 12,391,479 B2
(45) Date of Patent: Aug. 19, 2025

(54) SYSTEMS AND METHODS FOR ADAPTING ROBOTIC RETRIEVAL TO INCREASINGLY DENSE CONTAINER ARRANGEMENTS (71) Applicant: inVia Robotics, Inc., Westlake Village, CA (US)

(72) Inventors: Joseph Traverso, Simi Valley, CA (US); Randolph Charles Voorhies, Newbury Park, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 618 days.

(21) Appl. No.: 17/931,766

(22) Filed: Sep. 13, 2022

(65) Prior Publication Data
US 2024/0083676 A1 Mar. 14, 2024

(51) Int. Cl.
B65G 1/137 (2006.01)
(52) U.S. Cl.
CPC .................................. B65G 1/1375 (2013.01)
(58) Field of Classification Search
CPC .................................................... B65G 1/1375
See application file for complete search history.

(56) References Cited

U.S. PATENT DOCUMENTS

| | | | |
|---|---|---|---|
| 9,796,527 B1* | 10/2017 | Kaukl | B65G 1/0492 |
| 2012/0003067 A1* | 1/2012 | Neeper | G01N 35/0099 |
| | | | 414/331.01 |
| 2017/0183157 A9* | 6/2017 | Massey | B25J 11/008 |
| 2018/0251302 A1* | 9/2018 | Valinsky | B65G 1/1373 |
| 2021/0027236 A1* | 1/2021 | Elazary | B25J 9/1687 |
| 2024/0199326 A1* | 6/2024 | Karolinczak | B65G 1/0492 |

* cited by examiner

Primary Examiner — Kyle O Logan
(74) Attorney, Agent, or Firm — Ansari Katiraei LLP; Arman Katiraei; Sadiq Ansari

(57) ABSTRACT

Provided is a robotic retrieval system that adapts robot operations to different densities with which containers are stored. The system determines a position of a particular container in a slot. The system selects a first side of the slot from which to gain access to the particular container based on the particular container being blocked from the first side by a first number of containers and from an opposite second side by a larger second number of containers. The system uses robots to advance the particular container to the frontmost position at the first side of the particular slot by removing the first number of containers from the first side, and by inserting the first number of containers into the second side, and to transfer the particular container to a target destination after advancing the particular container to the frontmost position at the first side.

20 Claims, 8 Drawing Sheets

FIG. 8

SYSTEMS AND METHODS FOR ADAPTING ROBOTIC RETRIEVAL TO INCREASINGLY DENSE CONTAINER ARRANGEMENTS

BACKGROUND

Robots performing container or object retrieval or placement have limited reach. For instance, a robot that moves to a position before a rack may be able to extend a gripper a specified distance to grab a container from the rack. If the container is inset within the rack by more than the specified distance, the robot will be unable to engage and retrieve that container. Accordingly, warehouses that rely on the robots for container retrieval and placement adapt the rack configurations and the number of containers on the racks according to the robots' reach.

Figure 1:
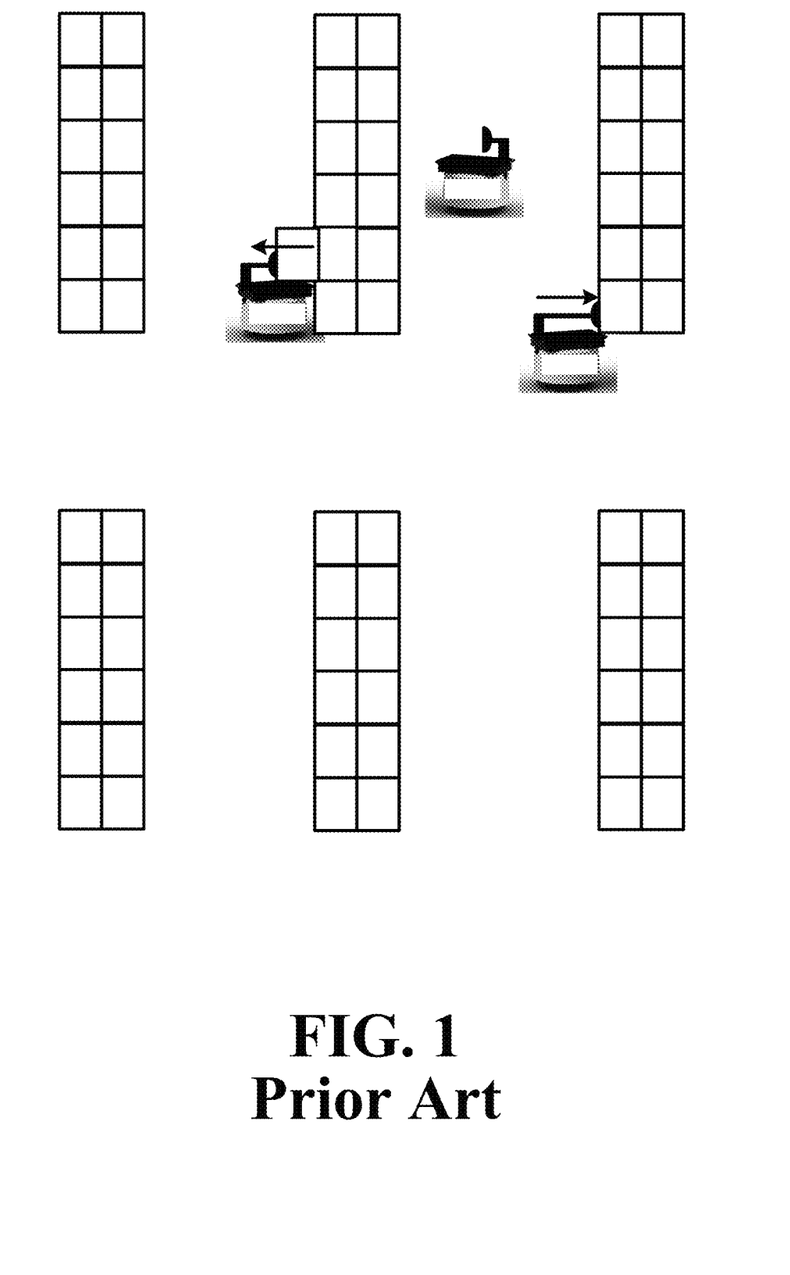
FIG. 1 presents a prior art image of a warehouse layout that modifies the rack configurations and the density of containers stored on the racks to accommodate the limited reach of the robots.

FIG. 1 presents a prior art image of a warehouse layout that modifies the rack configurations and the density of containers stored on the racks to accommodate the limited reach of the robots. In FIG. 1, the robots have a reach that is limited to the containers at the rack edge or side. Accordingly, each rack is adapted to hold one container on either side to allow the robots to retrieve or place the containers about either side of the rack. Such a layout and usage of racks that are two containers deep result in lots of wasted space. Specifically, more aisles of empty space are created to accommodate the robots' limited reach to containers on the rack edges or sides.

DETAILED DESCRIPTION OF PREFERRED EMBODIMENTS

The following detailed description refers to the accompanying drawings. The same reference numbers in different drawings may identify the same or similar elements.

Provided are systems and methods for adapting robotic retrieval to increasingly dense container arrangements. Specifically, the system and methods increase the container density (e.g., the rack width and the number of containers that are stacked behind one another in a column) on storage racks within a storage facility, and increase the container depth that each robot is able to access without extending the robots' reach or modifying other robotic hardware for the increasingly dense container arrangements. Consequently, the robots are made to adapt to the density of the container arrangements rather than adapting the density of the container arrangements to the robots. This results in the warehouse or other storage facility, that employs the robots for container retrieval and placement, having fewer aisles for robots to move between, and the reduced aisle space is instead reconfigures for larger width racks that hold more than two containers in each slot, column, and/or row.

Figure 2:
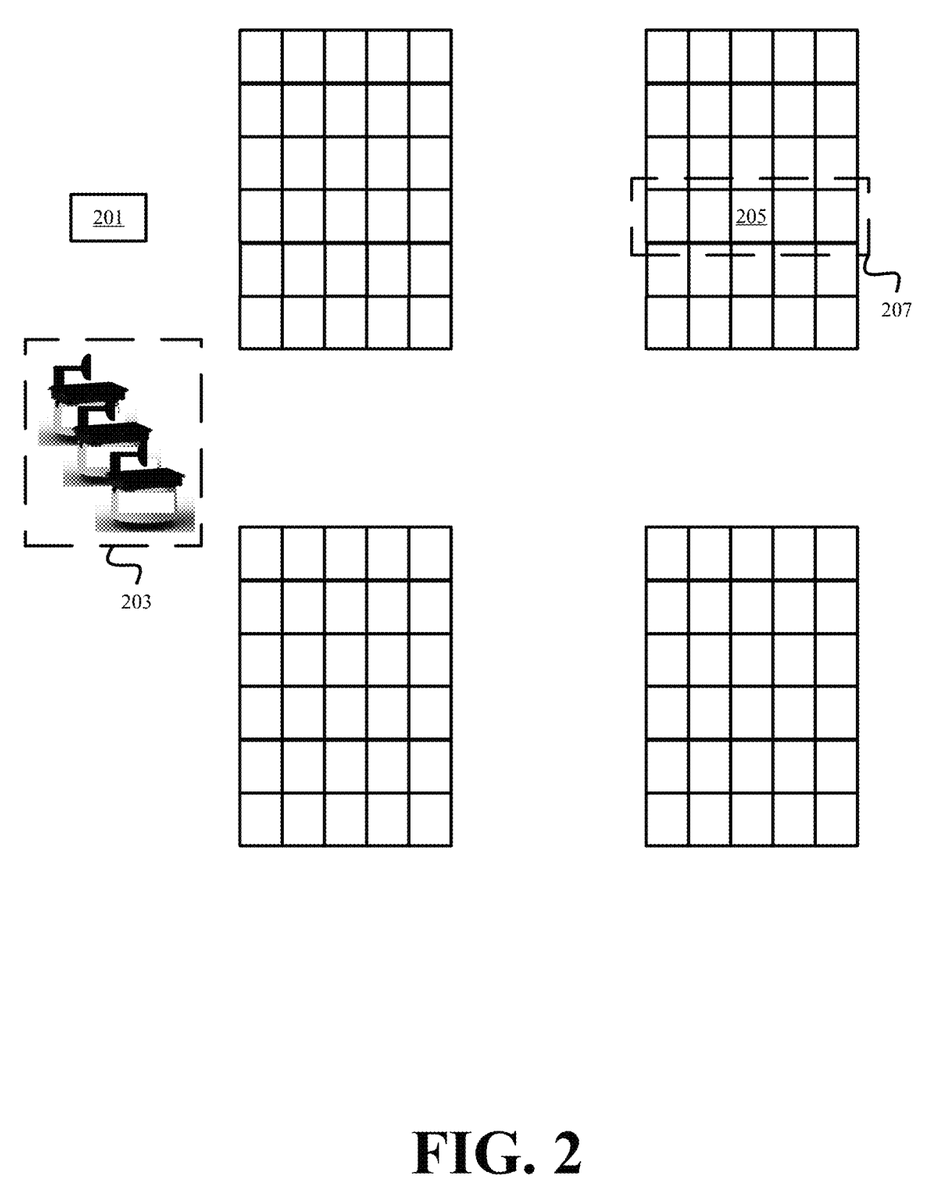
FIG. 2 illustrates a robotic retrieval system that adapts robotic retrieval and placement operations to increased densities of a modified storage architecture in accordance with some embodiments presented herein.

FIG. 2 illustrates a robotic retrieval system that adapts robotic retrieval and placement operations to increased densities of a modified storage architecture in accordance with some embodiments presented herein. The robotic retrieval system includes controller 201 and robots 203. The modified storage architecture includes a storage facility with racks. Each rack has one or more shelves at one or more heights that are reachable by robots 203. Each rack shelf has one or more container slots, and each container slot has a width that accommodates three or more containers. As shown in FIG. 2, each container slot holds five containers stacked behind one another such that the retrieval of middle container 205 from container slot 207 requires the two containers in front of or behind middle container 205 (e.g., on either side of middle container 205) to be moved before middle container 205 can be accessed. A container includes a box, receptacle, tote, package, or another object that holds one or more items.

Robots 203 correspond to autonomous devices or machines that perform retrieval and placement operations without human intervention. Each robot 203 includes a motorized base, a lift, a retrieval element, a set of sensors, and/or other actuators and compute resources (e.g., one or more hardware processors, memory, storage, network connectivity, etc.).

The motorized base includes one or more motors, wheels, articulating legs, and/or other means of locomotion to move a robot 203 within the modified storage architecture. The lift raises the retrieval element to different heights or different shelves. The retrieval element includes an articulating arm, a suction cup, vacuum, gripper arm, crane, and/or other means for engaging a container or another object from a side, top, or bottom, and for moving the engaged container off of or onto a particular container slot about a rack shelf. Specifically, robots 203 use the motorized base, lift, retrieval elements, sensors, actuators, and/or compute resources to move within the storage facility, align with a vertical and horizontal position (e.g., a position in three-dimensional ("3D") space) of a container or a container slot where a desired container is located, and to retrieve or place a container at the aligned position.

However, the range of the retrieval element is limited. The retrieval element extends a distance that is less than a depth at which one or more of the containers within a rack are positioned. In other words, the reach of the retrieval element may prevent robots 203 from engaging containers that are not at the edge of the rack or that are arranged one or more containers behind the frontmost or outermost container on either the front side or the back side of any of the container slots on the different rack shelves. Nevertheless, these reach limitations are overcome by the robotic retrieval system and associated methods of operations.

In some embodiments, controller 201 includes one or more devices that are separate from but that wirelessly communicate with robots 203. In some other embodiments, controller 201 is a distributed system that is embedded as part of each robot 203. Controller 201 tracks state of each container and controls or coordinates the retrieval and placement operations performed by robots 203.

The tracked state includes the current position of each container about the different container slots of the different shelfs of the different racks within the modified storage architecture. In some embodiments, controller 201 tracks and updates the container positions based on messaging that is provided by robots 203 as they move containers. For instance, each container may include a first machine-readable fiducial that robots 203 scan to identify the container that is being moved, and each side or face of a container slot about a rack (e.g., the front and back sides) may include a different second machine-readable fiducial that robots 203 scan to identify the position that the container is being moved from or moved to (e.g., which side of which container slot a container is placed or retrieved from). Controller 201 tracks the depth of the containers within a container slot on a rack shelf based on the number of containers that are inserted or removed from either side of that container slot. Accordingly, when a first container is inserted into a front side of a particular container slot, controller 201 updates the positioning of the first container to be at the front side of the particular container slot, and also updates any other containers stored in the particular container slot that have been shifted one container position to the back side of the particular container slot as a result of inserting of the first container to the front side.

The tracked state also includes access history of each container. The access history includes the number of times a container is retrieved as part of fulfilling different orders over a period of time, the frequency with which the container is requested, the remaining items in the container, patterns associated with the container retrieval, and/or events that are associated with the container retrieval.

In some embodiments, controller 201 coordinates the operations of robots 203 based on the tracked container state. For instance, controller 201 determines a repositioning or movement of containers that is necessary for a robot 203 to gain access to a particular container that is stacked behind one or more containers in a container slot.

Figure 3:
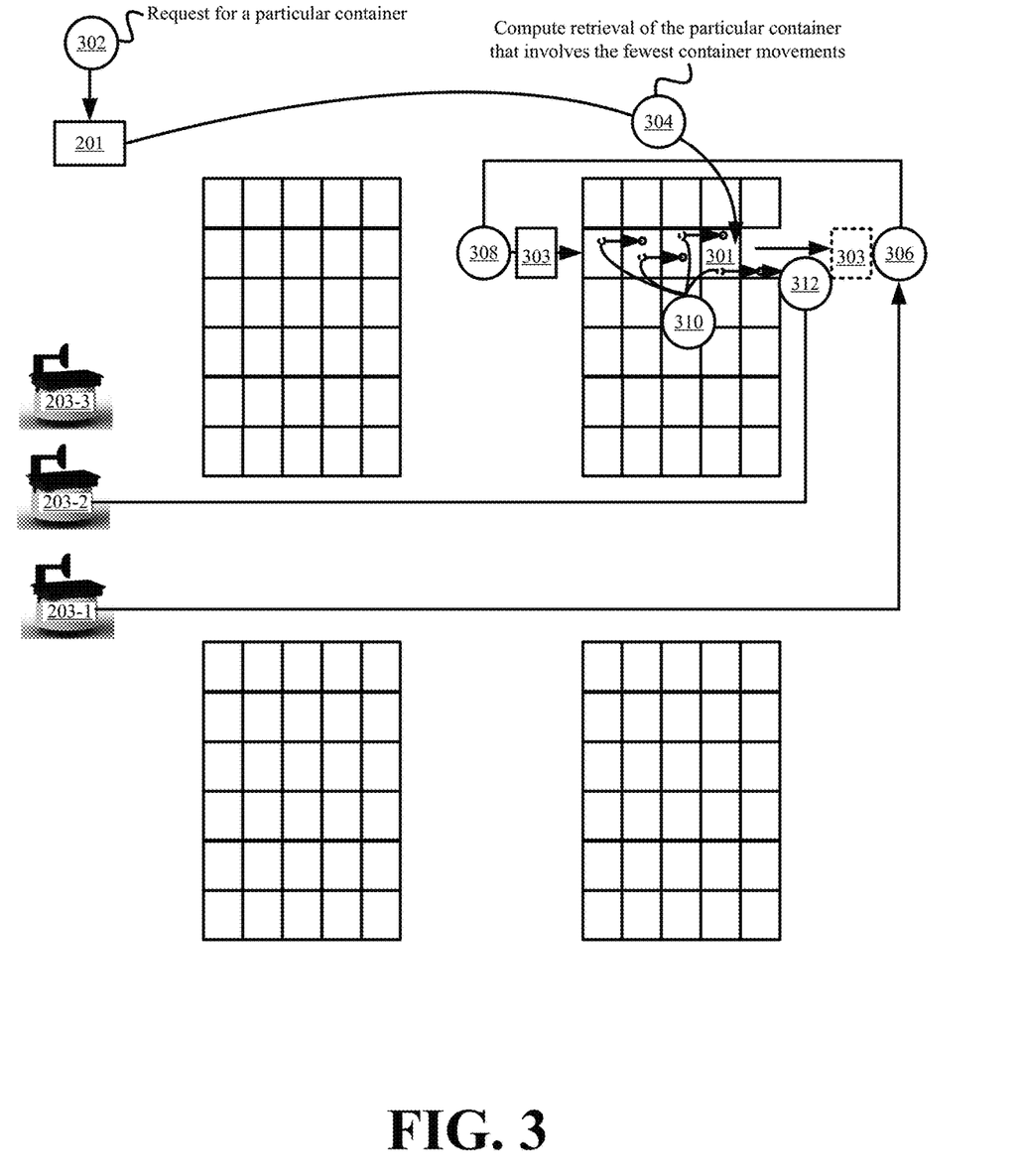
FIG. 3 illustrates an example of adapting the operations of one or more robots to access a container that is stacked behind other containers in a container slot of a densely arranged rack in accordance with some embodiments presented herein.

FIG. 3 illustrates an example of adapting the operations of one or more robots to access a container that is stacked behind other containers in a container slot of a densely arranged rack in accordance with some embodiments presented herein. As shown in FIG. 3, controller 201 receives (at 302) a request for retrieval of container 301.

Controller 201 locates a position of container 301 based on the tracked states and/or tracked positions of the containers within the site. Controller 201 determines that container 301 is the fourth container from the front side of a five stacked arrangement of containers in a particular slot of a rack.

Based on the tracked state and/or tracked position of container 301, controller 201 computes (at 304) a most efficient retrieval of container 301. The most efficient retrieval corresponds to the fewest robotic movements and/or operations that open access to container 301. For instance, controller 201 determines that three containers have to be removed before gaining access to container 301 from the front side, whereas only one container has to be removed before gaining access to container 301 from the back side of the particular slot of the rack.

Controller 201 coordinates the operation of one or more robots 203 to access container 301 from the back side of the particular slot that is computed (at 304) to be the most efficient retrieval of container 301. Coordinating the operation of the one or more robots includes controlling first robot 203-1 in retrieving (at 306) container 303, that is the frontmost or outermost container at the back side of the particular slot, and in placing (at 308) container 303 at the front side of the particular slot.

By placing (at 308) container 303 at the front side of the particular slot, first robot 203-1 pushes (at 310) all other containers in the particular slot towards the back side. Consequently, targeted container 301 becomes the frontmost or outermost container at the back side of the particular slot.

Coordinating the operation of the one or more robots further includes using first robot 203-1 or another second robot 203-2 to retrieve (at 312) container 301 from the back side of the particular slot. In this manner, the robotic retrieval system allows for the site or storage facility to increase the density of containers that are stored in each container slot of a rack, and adapts one or more robots 203 with limited reach to access any container from any position or depth in the container slots without adapting the site configuration to accommodate the limited reach of robots 203 or modifying the retrieval element and/or other hardware used by robots 203 to retrieve, place, move, and/or otherwise interact with the containers. Consequently, the site requires fewer aisles for robots 203 to navigate between in order to access different containers from the dense arrangements. The reduced aisle space may instead be allocated to racks that have larger widths and that store more containers in a given container slot. Accordingly, the robotic retrieval systems adapts robots 203 to operate with increasingly dense container arrangements and/or in sites that store containers with different densities (e.g., slots with three containers, with four containers, etc.) without modifying robots 203 for longer or extended reach to access containers at different depths of the different container arrangements.

The robotic retrieval system further optimizes the operation of robots 203 by leveraging the container state in other slots in determining which containers to move and where to move them to in order to gain access to a targeted container. In other words, rather than place a container retrieved from one side of a particular slot to the opposite side of the slot, the robotic retrieval system analyzes the state of the retrieved container and the state of containers in other slots to determine whether placement in a neighboring slot reduces the number of operations needed to access a targeted container, reduces the future retrieval time for the retrieved container, and/or reduces overall order fulfillment time for the current order and future or pending orders. For instance, placing the retrieved container in another slot may prevent the retrieved container from becoming stacked behind other containers during a subsequent retrieval or may place the retrieved container in a slot that is closer to a destination for a subsequent retrieval of that container.

Figure 4:
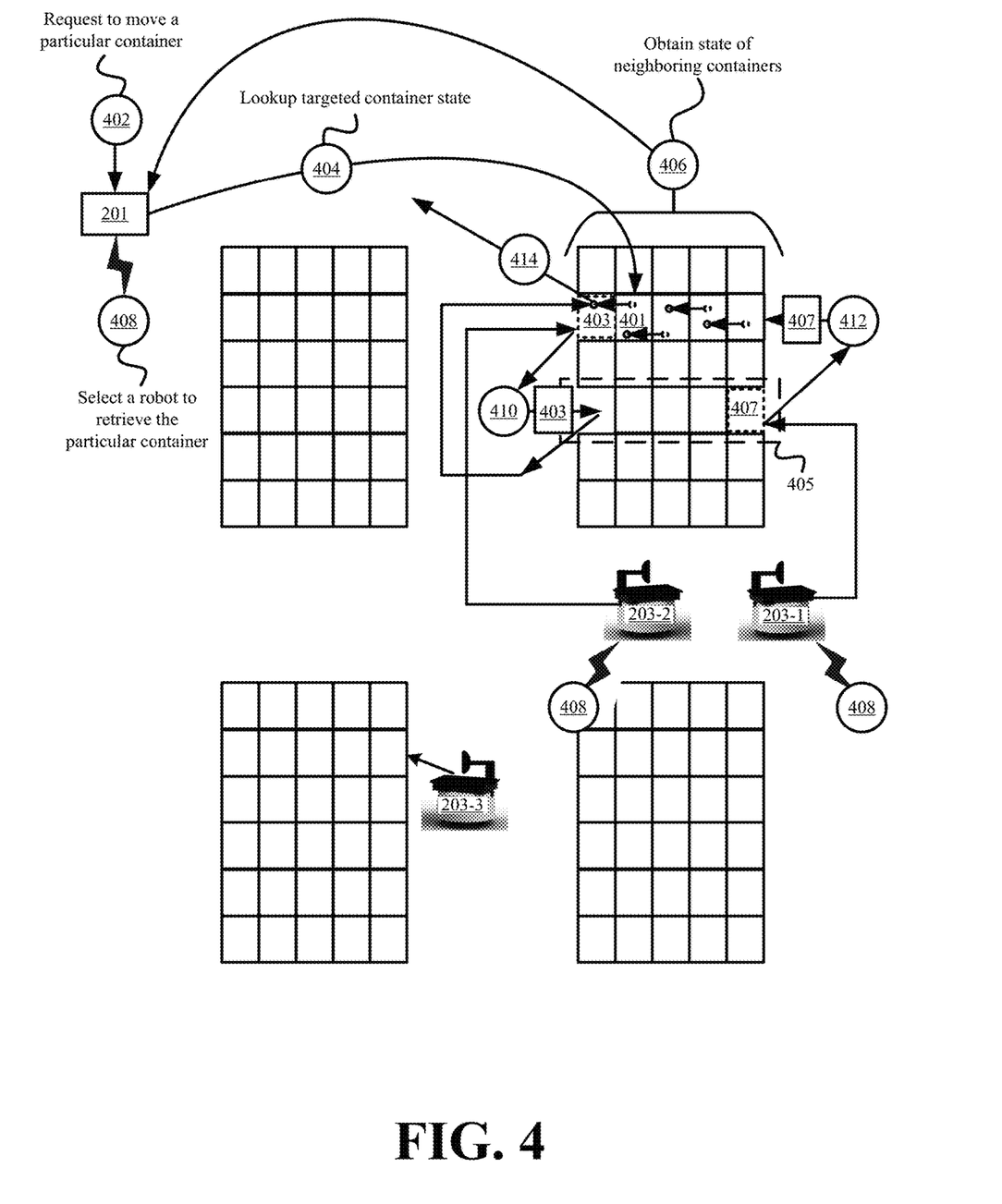
FIG. 4 illustrates an example of using the tracked states of neighboring containers to optimize current and future operations in accordance with some embodiments presented herein.

FIG. 4 illustrates an example of using the tracked states of neighboring containers to optimize current and future operations in accordance with some embodiments presented herein. Controller 201 receives (at 402) a request to transfer container 401 to a particular destination as part of a fulfilling a first received order.

Controller 201 looks (at 404) up the state of container 401 to determine the position of container 401 and to further determine that container 401 is positioned behind another container 403 that is the frontmost container about the front side of a particular slot. Controller 201 looks up or obtains (at 406) the state associated with other containers in the storage facility. Based on the obtained (at 406) container states, controller 201 determines that neighboring slot 405 is not full and is therefore able to accommodate another container.

Controller 201 also monitors the state of each robot 203-1, 203-2, and 203-3 based on messaging provided by robots 203-1, 203-2, and 203-3 to controller 201. The tracked robot state includes the position or each robot 203-1, 203-2, and 203-3 and/or a number of operations the robot is configured to perform.

Based on the holistic container state, controller 201 determines the fewest number of container moves required to retrieve container 401. To determine the fewest number of container moves, controller 201 may simulate different retrievals and placements of containers in different container slots with different robots 203-1, 203-2, and 203-3, and may compute an estimated time and/or the number of movements associated with performing each simulated set of retrievals and placements in order to determine the retrievals and placements that result in the fewest number of container moves. In this example, the fewest number of container moves involves coordinated operation by two robot about the front and back sides of the rack storing containers 401 and 403.

Controller 201 selects (at 408) second robot 203-2 to perform a first set of operations about the front side of the rack with containers 401 and 403, and first robot 203-1 to perform a second set of operations about the back side of the rack with containers 401 and 403 based on the monitored robot states. Specifically, controller 201 determines that second robot 203-2 is the closest available robot to container 401, and that first robot 203-1 is the closest available robot to the back side of the particular slot with containers 401 and 403.

Selecting (at 408) second robot 203-2 and first robot 203-1 includes sending messaging from controller 201 to second robot 203-2 that configures and activates second robot 203-2 to execute the first set of operations about the front side of the rack, and sending messaging from controller 201 to first robot 203-1 that configures and activates first robot 203-1 to execute the second set of operations about the back side of the rack. Moreover, controller 201 coordinates the execution of the different sets of operations as execution of the second set of operations may be dependent on one or more of the first set of operations being completed.

Second robot 203-2 moves (at 410) frontmost container 403 to the front side of neighboring slot 405 which is a shorter distance to travel than moving container 403 down the aisle and to the back side of the particular slot from which container 403 was retrieved. Contemporaneously, first robot 203-1 retrieves container 407 that is the frontmost container on the back side of slot 405, and pushes (at 412) container 407 in from the back side of the particular slot with container 401. Pushing (at 412) container 407 into the back side of the particular slot causes all other containers in the particular slot to shift to the front side by one container position. Specifically, container 401 is pushed one container position to the front side, thereby becoming the frontmost container about the front side of the particular slot. Second robot 203-2 then completes the first set of operations by retrieving and transferring (at 414) container 401 to the target destination.

Robot 203 moves back to the particular slot, retrieves container 401, and transfers (at 412) container 401 to the desired destination. In some embodiments, the retrieval element of robot 203 has sufficient reach to directly engage and/or retrieve containers that are the first or second containers in a stacked arrangement (e.g., the container at the edge of a slot or a container at a depth that is one container removed from the slot edge), thereby allowing robot 203 to retrieve container 401 without moving container 403 to the back side of the particular slot and pushing all other containers including container 401 one container position closer to the front side with the insertion of container 403 about the back side of the particular slot. In some other embodiments, the particular slot may be gravity fed or at an incline such that removal of frontmost container 403 causes all other containers in the particular slot to slide down one container position closer to the front side of the particular slot.

As shown in FIG. 4, the robotic retrieval system was able to access container 401 by moving container 403 over two slots about the front side of the rack, and by moving container 407 over two slots about the back side of the rack which results in fewer robotic movements than moving container 403 from the front side of the particular slot over to the back side of the particular slot. In other words, the robotic retrieval system leverages the container states and coordinate operations between second robot 203-2 and first robot 203-1 to retrieve and transfer container 401 to the desired destination in less time than it would have taken if only one robot was used or if a robot retrieved container 403 from the front side of the particular slot and pushed container 403 into the back side of the particular slot.

The robotic retrieval system may use additional container state besides the container positions to optimize the container retrieval and placement operations. For instance, container states such as tracked access history (e.g., last accessed time, frequency of access, percentage of orders involving a container, etc.), future or pending orders that involve a container, and/or other events that affect the frequency or timing with which the containers have been accessed in the past or will be accessed in the future may be used to coordinate the operations of the robots and control where retrieved containers are placed in order to open access to a targeted container. In some embodiments, predictive analytics may be derived from the container states and may be used for optimization of the container retrieval and placement operations.

Figure 5:
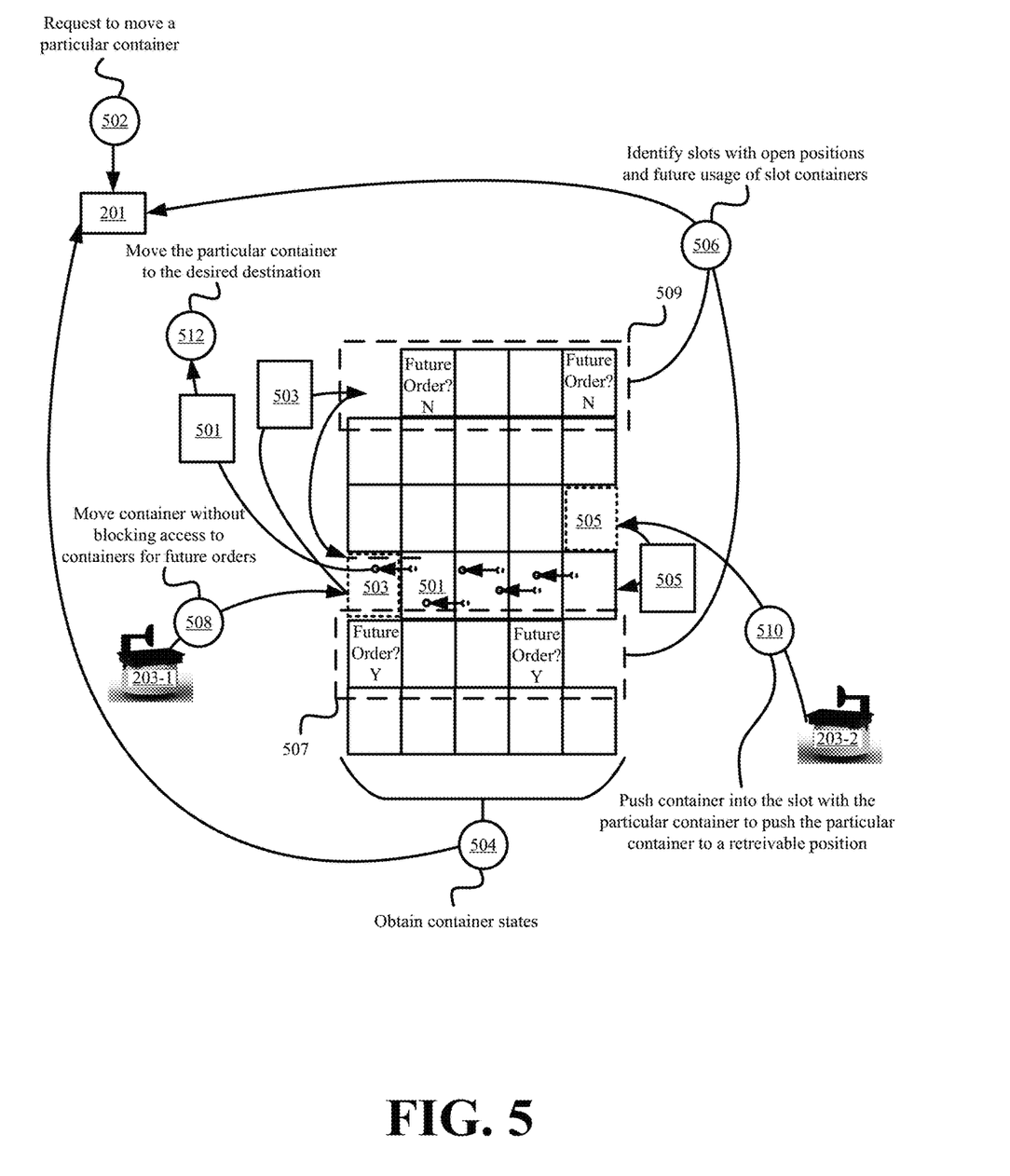
FIG. 5 illustrates an example of using container access history to modify robotic retrieval and placement of containers in accordance with some embodiments.

FIG. 5 illustrates an example of using container access history to modify robotic retrieval and placement of containers in accordance with some embodiments. Controller 201 receives (at 502) a request for a targeted container 501 that is the second container from the front side of a particular slot of a rack.

Controller 201 obtains (at 504) comprehensive state for targeted container 501 and other containers stored within the same site or distributed amongst the racks in the common space. The comprehensive state includes the location, access history, and predictive analytics for each container. The access history and predictive analytics identify if a particular container is required to fulfill part of a future or pending order or the likelihood that items within the particular container will be ordered as part of future order.

From the obtained (at 504) comprehensive state, controller 201 identifies (at 506) directly neighboring slot 507 with four containers and one open container slot, and slot 509 that is three slots away from the particular slot with four containers and one open container slot. Controller 201 analyzes the state of the containers in slots 507 and 509, and determines (at 506) that the frontmost containers in slot 507 are or will likely be required to fulfill future orders, whereas the containers in slot 509 are not and will likely not be required to fulfill future orders.

Controller 201 determines the minimal number of robotic and/or containers movements for fulfilling the current order involving container 501 and also the future or pending orders. Even though moving frontmost container 503 from the particular slot to slot 507 requires less movements and can be completed in less time than moving container 503 to slot 509, moving container 503 to slot 507 would increase the number of operations or movements that are needed to fulfill the future orders involving the containers in slot 507. In other words, moving container 503 to slot 507 reduces the time to execute the current order involving container 501, but increases the time to execute future orders. Accordingly, controller 201 defines the coordinated operations to avoid blocking the containers at the edges of the closer slot 507 and to move container 503 from the particular slot over to slot 509 so that execution time of the future orders is not increased. Controller 201 activates first robot 203-1 and second robot 203-2 to perform the coordinated operations.

In response to the activations and coordinated operations, first robot 203-1 moves (at 508) first container 503 from the front side of the particular slot to the front side of slot 509. First robot 203-1 pushes first container 503 into slot 509 from the front side of slot 509 using its retrieval element. First robot 203-1 signals controller 201 once first container 503 has been moved. In some embodiments, first robot 203-1 provides the updated state (e.g., location) of first container 503 to controller 201. The updated state indicates that first container 503 is now the frontmost container about the front side of slot 509 and that the particular slot now has an open container position.

In response to the activations, the coordinated operations, and the signaling or updated state provided by first robot 203-1, second robot 203-2 pushes (at 510) container 505, that is retrieved from the back side of the closest slot to the particular slot, into the back side of the particular slot. These operations cause container 501 to move and become the frontmost container on the front side of the particular slot. Second robot 203-2 updates the state of container 505 and/or the states or positions of the other affected containers in the particular slot.

In response to updated state from second robot 203-2, controller 201 activates first robot 203-1 in moving (at 512) container 501 from the frontmost position on the front side of the particular slot to a desired destination. The robotic retrieval system therefore simultaneously optimizes access to containers for future orders when moving those containers to open access to a particular container for a current order via an optimized set of operations that minimize robot and/or container movements without blocking access to the containers needed to fulfill future and/or pending orders.

Figure 6:
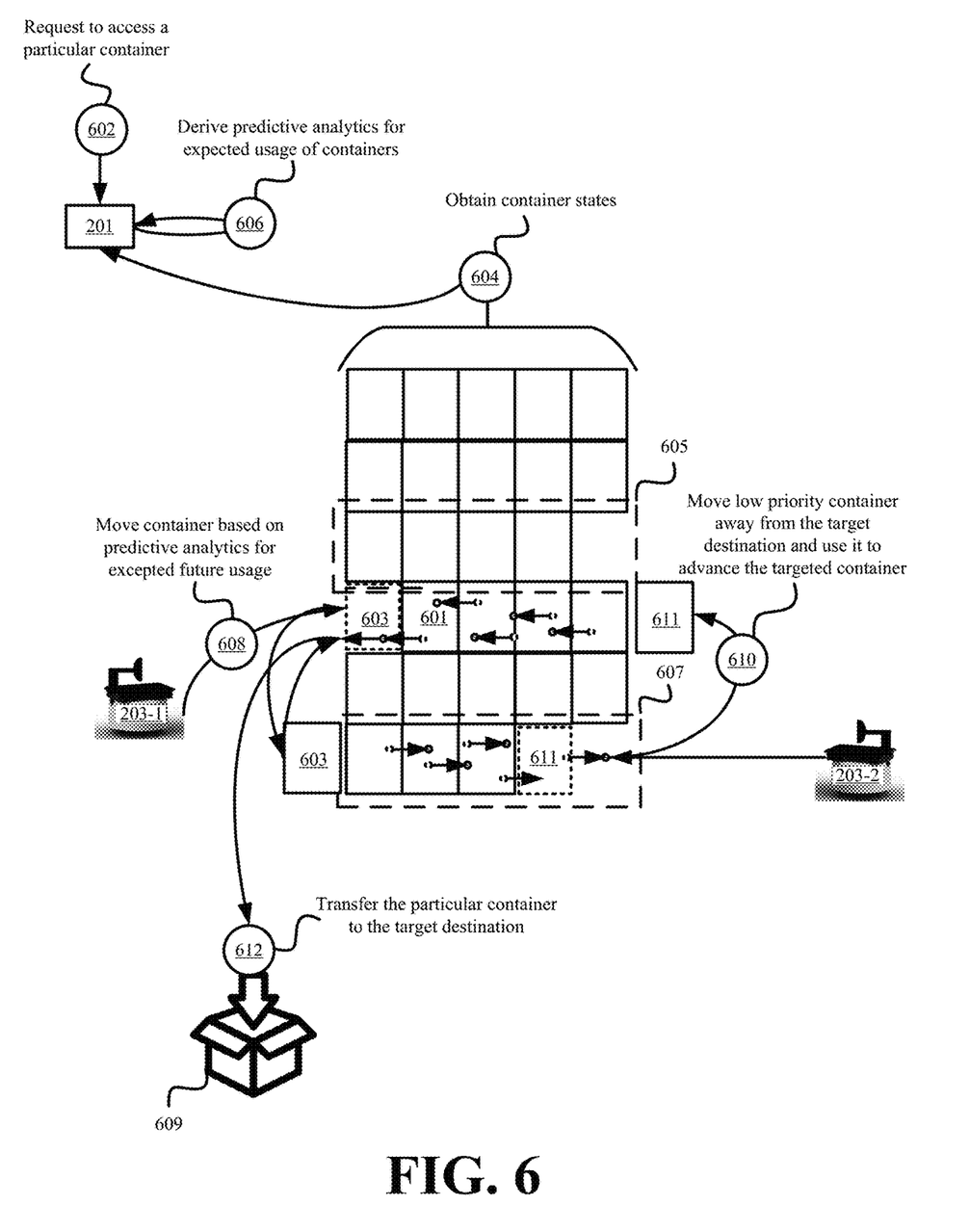
FIG. 6 illustrates an example of modifying robotic retrieval and placement of containers based on predictive analytics in accordance with some embodiments.

FIG. 6 illustrates an example of modifying robotic retrieval and placement of containers based on predictive analytics in accordance with some embodiments. Controller 201 receives (at 602) an order that involves one or more items in container 601. Controller 201 obtains (at 604) the state of container 601 and other containers stored within the site, and determines that container 601 is located behind container 603 about the front side of a particular slot. Accordingly, container 603 has to be moved in order to gain access to container 601.

Controller 201 derives (at 606) predictive analytics associated with container 603 based on the obtained (at 604) state of container 603 and various tracked events. For example, deriving (at 606) the predictive analytics may include analyzing the access history of container 603 to determine that container 603 becomes popular at an upcoming time of day or in the near future. Deriving (at 606) the predictive analytics may also include predicting a probability that container 603 is to be accessed in the near future based on monitored events. For instance, controller 201 may track sales that reduce the price of the items contained in container 603, marketing campaigns that promote the items contained in container 603, seasonality, weather changes, news events, and/or other events that impact the demand for container 603. Controller 201 may model behavioral patterns that associate different events or changes in events to demand changes affecting different containers.

Based on the derived (at 606) predictive analytics, controller 201 determines that container 603 is associated with a high priority, wherein the high priority indicates a high probability (e.g., greater than 80% likelihood) of the container 603 being requested in the next hour. Rather than move container 603 to closest slot 605 with an open container position or use container 603 to push container 601 to the front side of the particular slot, controller 201 optimizes the future retrieval of container 603 by identifying an open container position in slot 607 that is closest to target destination 609 where order fulfillment takes place.

Controller 201 directs first robot 203-1 in retrieving and placing (at 608) container 603 to slot 607 that has an open container position and that is closest to order fulfillment destination 609. Controller 201 then identifies a container to push in from the back side of the particular slot storing container 601 in order to advance container 601 to the front side of the particular slot. However, rather than select any container to move, controller 201 derives the predictive analytics for the containers to identify high priority container that may be moved closer to target destination 609 or a low priority container that may be moved further away from target destination 609.

As shown in FIG. 6, controller 201 determines that container 611, that has become the frontmost container on the back side of slot 607 as a result of placing (at 608) container 603 to the front side of slot 607, is a low priority container or a container that has a low probability of included as part of a future order. Accordingly, controller 201 directs second robot 203-2 in moving (at 610) container 611 from slot 607 to the back side of the particular slot where target container 601 is located. Consequently, target container 601 shifts a container position to the front side of the particular slot and becomes the frontmost container about the front side of the particular slot. The robotic retrieval system therefore makes target container 601 accessible while simultaneously reducing time for fulfilling future order by moving high priority container 603 closer to target destination 609 so that it may be transferred to target destination 609 in less time when requested as part of a future order, and by moving low priority container 611 further away from target destination 609 so that another position open in slot 607 for placement of another high priority container.

First robot 203-1 or a third robot then retrieves and transfers (at 612) target container 601 to target destination 609. One or more agents retrieve a desired quantity of items from container 601 at target destination 609 in order to fulfill the received order before a robot returns container 601 to a slot with an open container position that is selected based on the state and predictive analytics associated with container 601.

In this manner, the robotic retrieval system optimizes current, future, and predicted retrieval tasks at the same time instead of simply minimizing the retrieval time for a current order that is being fulfilled. As shown in FIG. 6, first robot 203-1 and second robot 203-2 perform coordinated operations that not only minimize the retrieval time associated with requested container 601, but that also optimize the placement of containers 603 and 611 based on derived predictive analytics for expected future usage of those containers 603 and 611 as part of yet to be received orders.

Figure 7:
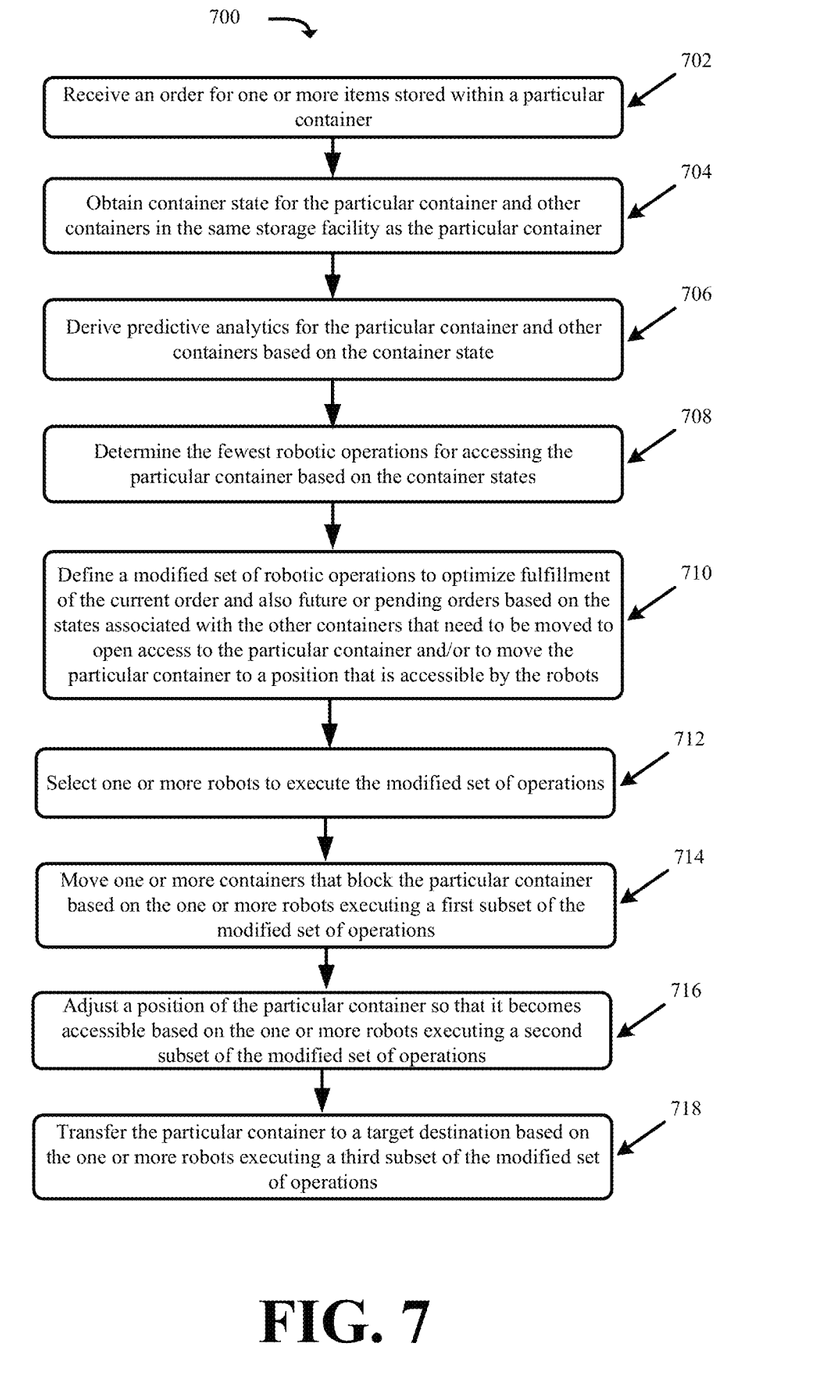
FIG. 7 presents a process for performing an optimized robotic retrieval of containers from a densely stacked arrangement of containers in accordance with some embodiments.

FIG. 7 presents a process 700 for performing an optimized robotic retrieval of containers from a densely stacked arrangement of containers in accordance with some embodiments. The densely stacked container arrangement prevents robots 203 from directly accessing containers that are located behind other containers and/or from reaching containers that are not a specified distance from robots 203 or the reach of their retrieval elements. Process 700 is implemented by controller 201 and robots 203 of the robotic retrieval system.

Process 700 includes receiving (at 702) an order for one or more items stored within a particular container. In some embodiments, a set of received orders may be queued by the robotic retrieval system, and the robotic retrieval system may determine an optimized order with which to fulfill the set of orders. For instance, the robotic retrieval system may scan the orders to determine which orders include the same items that are stored in the same containers, and may change the fulfillment sequence to batch fulfill orders that include the same items so that the same containers are retrieved once.

Process 700 includes obtaining (at 704) container state for the particular container and other containers in the same storage facility as the particular container. The container state identifies the current position of each container within the storage facility. The current position includes the rack, the slot within the rack, and the container position within the slot for each container. Each time a robot moves a container into or out of a slot, the state or position of that container and other containers in that slot may be updated. The container state further identifies access histories associated with each container. The access history tracks the number of times that each container is included as part of an order as well as events associated with a requested container. The events may include different sales, marketing campaigns, temporal events, news, specific web searches, and/or other data that impacts when a container is requested.

Process 700 includes deriving (at 706) predictive analytics for the particular container and other containers based on the container state. Deriving (at 706) the predictive analytics includes predicting a probability that each container will be accessed in the future based on trends or patterns in the access history, in incoming and past orders, and/or associations between events and each container.

Process 700 includes determining (at 708) the fewest robotic operations for accessing the particular container based on the container states. Determining (at 708) the fewest robotic operations includes determining whether it is more efficient to access the particular container from the front side or the back side of the rack or slot where the particular container is stored based on the number of other containers that need to be moved from each of the front side or the back side. Determining (at 708) the fewest robotic operations further includes determining the fewest operations for moving the other containers that block access to the particular container, and for moving the particular container to a slot position where it is directly accessible by a robot. Moving the other containers includes identifying other slots with open container positions that the robots can move the other containers to in the least amount of time.

Process 700 includes defining (at 710) a modified set of robotic operations to optimize fulfillment of the current order and also future or pending orders based on the states associated with the other containers that need to be moved to open access to the particular container and/or to move the particular container to a position that is accessible by the robots. Defining (at 710) the modified set of robotic operations includes adjusting the determined (at 708) fewest robotic operations based on whether the other containers may be buried in the middle of a slot or placed in a slot far away from an order fulfillment destination, or if the other containers have probabilities that exceed a threshold for being requested as part of a future order or are already requested as part of a pending future order in which case the other containers are to moved closer to the order fulfillment destination and/or placed as a frontmost container of a slot rather than be pushed deeper into a slot and be blocked by one or more other containers. Accordingly, the modified set of robotic operations may require more movements or more time to complete than the determined (at 708) fewest robotic operations. However, the modified set of robotic operations reduce the operations and time needed to access containers for future orders, thereby reducing the overall time and overall number of operations performed by the robots to fulfill a set of orders.

Process 700 includes selecting (at 712) one or more robots to execute the modified set of operations. The selection (at 712) of robots is based on the current state of each robot. For instance, controller 201 tracks a position of each robot based on signaling provided by the robots to controller 201 as they retrieve, place, or move containers from the racks or based on previous operations that were assigned and executed by each robot. Controller 201 also tracks whether a robot is idle, the number of operations that a robot has to complete, and/or performance history of each robot. Controller 201 selects (at 712) the one or more robots that are available or will be available in the shortest amount of time and that are closest to the positions of the containers that are to be moved as part of the modified set of operations for accessing the particular container. For instance, controller 201 selects (at 712) a first robot to move a blocking container and access the particular container from a front side of the slot where the particular container is stored, and selects (at 712) a second robot to retrieve other containers from a back side of other slots and to push those containers into the back side of the slot where the particular container is stored in order to advance the particular container closer to the front side once the first robot removes the blocking containers.

Process 700 includes activating (at 712) the one or more robots for coordinated execution of the modified set of operations. The coordinated execution involves determining dependencies between different subsets of the modified set of operations. The dependencies include waiting for a removal of one container from a particular slot before another container can be inserted into that particular slot or before other containers in the particular slot may be shifted toward a front side or back side of the particular side. Accordingly, the coordinated execution involves a specific sequencing with which each robot of the one or more robots performs different subsets of the modified set of operations to advance the particular container to a frontmost position and to retrieve the particular container from the frontmost position with the fewest number of robotic operations and/or movements of other containers that also optimizes the future retrieval of the other containers.

Process 700 include moving (at 714) one or more containers that block the particular container based on the one or more robots executing a first subset of the modified set of operations, adjusting (at 716) a position of the particular container so that it becomes accessible or within reach of the robots' retrieval element based on the one or more robots executing a second subset of the modified set of operations, and transferring (at 718) the particular container to a target destination based on the one or more robots executing a third subset of the modified set of operations. Accordingly, the one or more robots autonomously access and transfer the particular container to the target destination in an optimized manner without human intervention while simultaneously optimizing access to the other containers that were moved for fulfillment for more efficient fulfillment of future or pending orders, wherein the more efficient fulfillment corresponds to completing the future or pending orders in less time and/or with fewer robotic movements than if the other containers remained in their original position.

Figure 8:
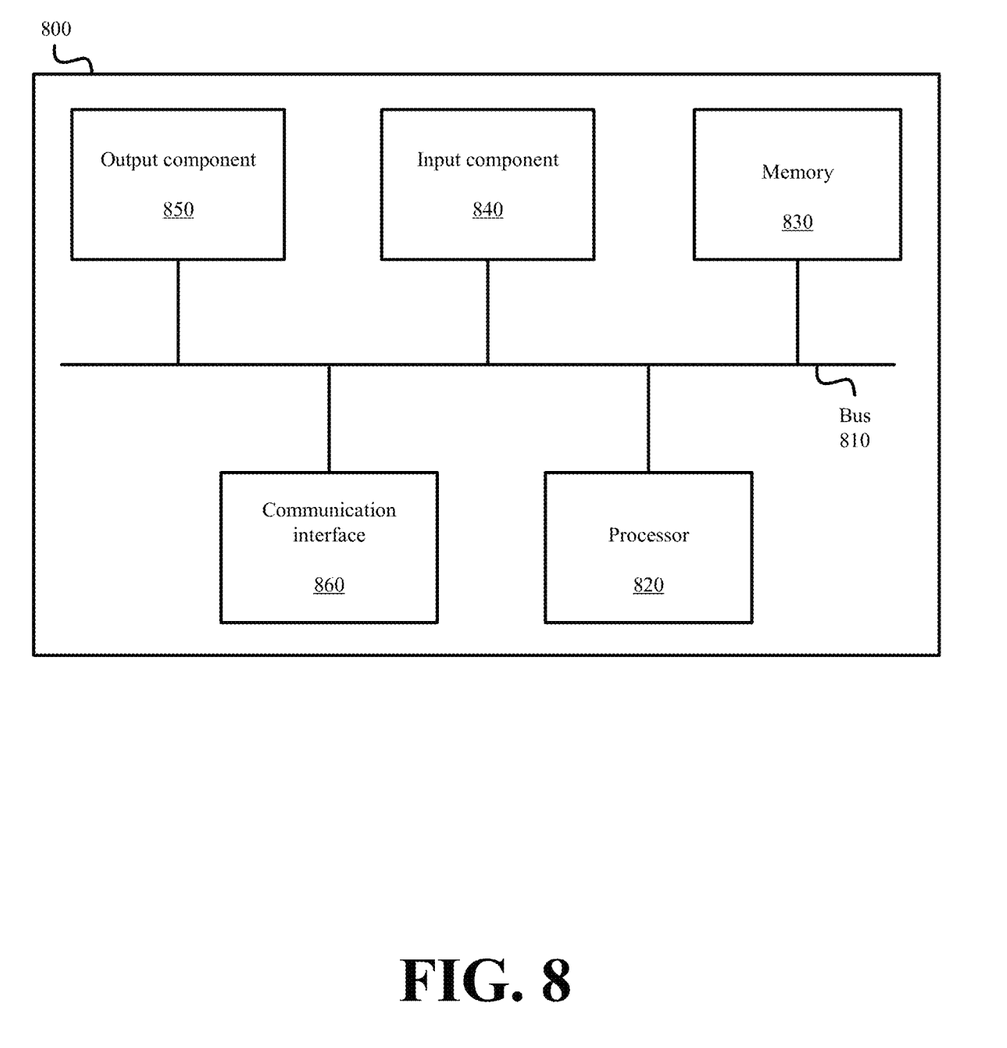
FIG. 8 illustrates example components of one or more devices, according to one or more embodiments described herein.

FIG. 8 is a diagram of example components of device 800. Device 800 may be used to implement one or more of the devices or systems described above (e.g., the robotic retrieval system, controller 201, robots 203, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a request for a particular container from a plurality of containers, wherein the plurality of containers are distributed across a plurality of slots, wherein each slot of the plurality of slots holds three or more of the plurality of containers;
   determining a position of the particular container within a particular slot of the plurality of slots based on signaling provided by a set of robots;
   selecting a first side of the particular slot from which to gain access to the particular container based on the particular container being blocked from the first side by a first number of containers that are in between the position of the particular container and a frontmost position at the first side of the particular slot, and the particular container being blocked from an opposite second side of the particular slot by a second number of containers that are in between the position of the particular container and a frontmost position at the second side of the particular slot, wherein the first number of containers is less than the second number of containers;
   advancing the particular container to the frontmost position at the first side of the particular slot by removing the first number of containers from the first side of the particular slot using the set of robots, and by inserting the first number of containers into the second side of the particular slot using the set of robots; and
   transferring the particular container from the frontmost position at the first side to a target destination with a particular robot from the set of robots after advancing the particular container to the frontmost position at the first side.

2. The method of claim 1,
   wherein removing the first number of containers comprises removing a first container of the plurality of containers from the first side with a first robot of the set of robots; and
   wherein inserting the first number of containers comprises placing the first container at the second side with the first robot after the first robot transfers the first container from the first side to the second side.

3. The method of claim 1,
   wherein removing the first number of containers comprises removing a first container of the plurality of containers from the first side with a first robot of the set of robots and placing the first container into the first side of a first slot from the plurality of slots that is a closest slot to the particular slot with an open container position; and
   wherein inserting the first number of containers comprises retrieving a second container of the plurality of containers from the second side of a second slot from the plurality of slots with a second robot of the set of robots, and placing the second container into the second side of the particular slot with the second robot, wherein the first slot and the second slots are different slots than the particular slot.

4. The method of claim 1, wherein advancing the particular container comprises:
   removing a first container from the first side of the particular slot with a first robot of the set of robots;
   providing signaling from the first robot that the first container is removed from the first side of the particular slot; and
   activating a second robot of the set of robots in transferring a second container into the second side of the particular slot in response to the signaling from the first robot.

5. The method of claim 4 further comprising:
   providing signaling from the second robot that the second container is added to the second side of the particular slot; and
   updating positions of a subset of the plurality of containers in the particular slot in response to the signaling from the second robot, wherein updating the positions comprises changing the position of the particular container to be one container position closer to the frontmost position at the first side.

6. The method of claim 5, wherein transferring the particular container comprises:
   retrieving the particular container from the frontmost position at the first side of the particular slot with the particular robot in response to the signaling from the second robot and changing the position of the particular container to the frontmost position.

7. The method of claim 1 further comprising:
   selecting a first set of slots from the plurality of slots with open container positions over a second set of slots from the plurality of slots with open container positions to receive the first number of containers that are removed from the first side of the particular slot in response to containers at the first side and the second side of the first set of slots not being part of a future set of orders and containers at the first side and the second side of the second set of slots being part of the future set of orders; and
   inserting each container of the first number of containers that is removed from the first side of the particular slot to the first side of one of the first set of slots.

8. The method of claim 1,
   wherein each robot of the set of robots comprises a retrieval element; and
   wherein the retrieval element extends a distance that is limited to engaging a container at the frontmost position on the first side or the second side of the plurality of slots.

9. The method of claim 1, wherein inserting the first number of containers comprises:

pushing a subset of containers remaining in the particular slot one container position towards the first side of the particular slot in response to each container that is inserted into the second side of the particular slot by the set of robots.

10. The method of claim 1 further comprising:
determining a probability of a first container, that is positioned closer to the first side of the particular slot than the particular container and that is removed from the first side of the particular slot, being requested as part of a future order;
inserting the first container to a first slot of the plurality of slots with an open container position that is closer to the target destination than a second slot of the plurality of slots with an open container position in response to the probability being greater than a threshold; and
inserting the first container to the second slot in response to the probability being less than the threshold.

11. The method of claim 1 further comprising:
determining that a first container, that is positioned closer to the first side of the particular slot than the particular container and that is removed from the first side of the particular slot by the set of robots, contains one or more items for a set of pending orders, and that a second container, that is positioned closer to the first side of the particular slot than the particular container and that is removed from the first side of the particular slot by the set of robots, does not contain one or more items for the set of pending orders;
inserting the first container to a first slot of the plurality of slots with an open container position that is closer to the target destination than a second slot of the plurality of slots with an open container position in response to the first container containing the one or more items for the set of pending orders; and
inserting the second container to the second slot in response to the second container not containing the one or more items for the set of pending orders.

12. A robotic retrieval system comprising:
a controller comprising one or more hardware processors configured to:
receive a request for a particular container from a plurality of containers, wherein the plurality of containers are distributed across a plurality of slots, wherein each slot of the plurality of slots holds three or more of the plurality of containers;
determine a position of the particular container within a particular slot of the plurality of slots; and
select a first side of the particular slot from which to gain access to the particular container based on the particular container being blocked from the first side by a first number of containers that are in between the position of the particular container and a frontmost position at the first side of the particular slot, and the particular container being blocked from an opposite second side of the particular slot by a second number of containers that are in between the position of the particular container and a frontmost position at the second side of the particular slot, wherein the first number of containers is less than the second number of containers; and
a set of robots operating under control of the controller, wherein the set of robots:
advance the particular container to the frontmost position at the first side of the particular slot by removing the first number of containers from the first side of the particular slot, and by inserting the first number of containers into the second side of the particular slot; and
transfer the particular container from the frontmost position at the first side to a target destination after advancing the particular container to the frontmost position at the first side.

13. The robotic retrieval system of claim 12,
wherein removing the first number of containers comprises removing a first container of the plurality of containers from the first side with a first robot of the set of robots; and
wherein inserting the first number of containers comprises placing the first container at the second side with the first robot after the first robot transfers the first container from the first side to the second side.

14. The robotic retrieval system of claim 12,
wherein removing the first number of containers comprises removing a first container of the plurality of containers from the first side with a first robot of the set of robots and placing the first container into the first side of a first slot from the plurality of slots that is a closest slot to the particular slot with an open container position; and
wherein inserting the first number of containers comprises retrieving a second container of the plurality of containers from the second side of a second slot from the plurality of slots with a second robot of the set of robots, and placing the second container into the second side of the particular slot with the second robot, wherein the first slot and the second slots are different slots than the particular slot.

15. The robotic retrieval system of claim 12, wherein advancing the particular container comprises:
removing a first container from the first side of the particular slot with a first robot of the set of robots;
providing signaling from the first robot that the first container is removed from the first side of the particular slot; and
activating a second robot of the set of robots in transferring a second container into the second side of the particular slot in response to the signaling from the first robot.

16. The robotic retrieval system of claim 15, wherein the one or more hardware processors are further configured to:
receive signaling from the second robot that the second container is added to the second side of the particular slot; and
update positions of a subset of the plurality of containers in the particular slot in response to the signaling from the second robot, wherein updating the positions comprises changing the position of the particular container to be one container position closer to the frontmost position at the first side.

17. The robotic retrieval system of claim 16, wherein transferring the particular container comprises:
retrieving the particular container from the frontmost position at the first side of the particular slot with a particular robot of the set of robots in response to the signaling from the second robot and changing the position of the particular container to the frontmost position.

18. The robotic retrieval system of claim 12,
wherein the one or more hardware processors are further configured to select a first set of slots from the plurality of slots with open container positions over a second set of slots from the plurality of slots with open container positions to receive the first number of containers that are removed from the first side of the particular slot in response to containers at the first side and the second side of the first set of slots not being part of a future set of orders and containers at the first side and the second side of the second set of slots being part of the future set of orders; and wherein removing the first number of containers comprises inserting each container of the first number of containers that is removed from the first side of the particular slot to the first side of one of the first set of slots.

19. The robotic retrieval system of claim 12, wherein each robot of the set of robots comprises a retrieval element; and wherein the retrieval element extends a distance that is limited to engaging a container at the frontmost position on the first side or the second side of the plurality of slots.

20. A non-transitory computer-readable medium storing program instructions that, when executed by one or more hardware processors of a robotic retrieval system, cause the robotic retrieval system to perform operations comprising:

receive a request for a particular container from a plurality of containers, wherein the plurality of containers are distributed across a plurality of slots, wherein each slot of the plurality of slots holds three or more of the plurality of containers;

determine a position of the particular container within a particular slot of the plurality of slots based on signaling provided by a set of robots;

select a first side of the particular slot from which to gain access to the particular container based on the particular container being blocked from the first side by a first number of containers that are in between the position of the particular container and a frontmost position at the first side of the particular slot, and the particular container being blocked from an opposite second side of the particular slot by a second number of containers that are in between the position of the particular container and a frontmost position at the second side of the particular slot, wherein the first number of containers is less than the second number of containers;

advance the particular container to the frontmost position at the first side of the particular slot by removing the first number of containers from the first side of the particular slot using the set of robots, and by inserting the first number of containers into the second side of the particular slot using the set of robots; and transfer the particular container from the frontmost position at the first side to a target destination with a particular robot from the set of robots after advancing the particular container to the frontmost position at the first side.

* * * * *